May 24, 1949.
T. STULAND
2,470,877
METHOD AND APPARATUS FOR DETECTING VARIATIONS
IN THE APPEARANCE OF AN OBJECT OR SAMPLE
Filed Oct. 18, 1946
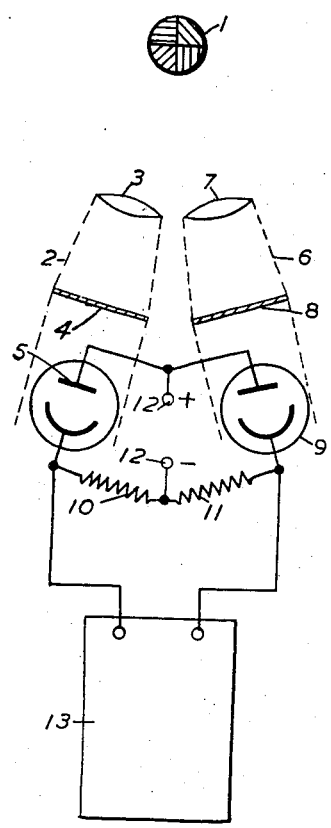
Inventor
Tor Stuland
By
John E Eastlack
Attorney Patented May 24, 1949

2,470,877

UNITED STATES PATENT OFFICE 2,470,877

METHOD AND APPARATUS FOR DETECTING VARIATIONS IN THE APPEARANCE OF AN OBJECT OR SAMPLE

Tor Stuland, Stord, Norway

Application October 18, 1946, Serial No. 704,115
In Great Britain July 10, 1945

3 Claims. (Cl. 250—41.5)

The present invention relates to the detection of variations or alterations of an object or sample under test. The invention is of advantage in the automatic checking of products produced by repetition processes, whereby departures from a standard product may be readily detected and if desired arranged to initiate the operation of automatic control or rejecting apparatus.

With the present invention use is made of an image of the object or the standard object or sample, and changes in the appearance of the object or sample by comparison with such image. In the method according to the invention photoelectric means are provided to detect changes between the standard or comparison image and an image of the object being compared therewith. The invention also involves apparatus for carrying this method into effect.

In the simplest form, the method according to the invention may be carried out by setting up a camera in front of the object which is to be subject to observation or which is a standard object with which other objects are to be compared. A photographic plate is then exposed in the camera and is developed in the usual way to produce a negative image of the object, that is to say, one in which highlights in the object are represented by dense or opaque portions of the negative and darker portions of the object by more transparent portions of the negative.

The negative so produced is replaced in the camera in the same position as before, and the object for comparison is again caused to produce an optical image on the plate. Provided that the same photograph has been appropriately made, the intensity of the light passing through the negative is uniform over the area of the plate, since the parts of the optical image of greater light intensity fall upon the denser parts of the negative, and will be at a low value.

If now the object is replaced by another similar object for comparison in exactly the same position and conditions, provided that the photographic image is unchanged the light passing through the negative will be unchanged. If, however, there is any change in the photographic image there will be a change of light passing through the negative. By arranging a photosensitive device to receive the light passing through the negative, an indication of departure from the original object can be readily obtained, a suitable amplifier and detector device for this purpose being provided.

With the arrangement described the system may be more responsive to certain changes of the object than to others; for example the system may be less sensitive to changes in a highly illuminated area than to a shadow area. Accordingly I may employ a further device, similar to that described above, but using a positive transparent image in place of the negative image, and combine the effects of the two photo-sensitive devices.

An arrangement of this kind is shown diagrammatically in the accompanying drawing.

In this drawing the object 1 is placed in front of a "camera" 2 comprising a lens 3 and a plate 4 with which is associated a photosensitive cell 5, which is arranged within an extension of the "camera" so as to have external light excluded therefrom and thus serves to indicate the light passing through the plate 4. As described above, a negative image of the object 1 is produced and is inserted in the plate 4. As so far described the apparatus may be used in the manner first described above. Preferably, however, a second "camera" 6 comprising lens 7, a plate 8, a photosensitive cell 9 is used, but in this "camera" the plate 8 bears a positive transparent image of the object 1.

The output of the cells 5 and 9 are combined; as shown the cells are connected in series with equal resistances 10, 11 respectively and the terminals 12 of a common battery. The voltage appearing across the two resistances 10, 11 is applied to the input of an amplifier-detector arrangement indicated generally by 13.

With the arrangement of the second "camera" with its positive image the light passing through the image will be a maximum when the optical image is identical with the positive image; any departure of the object from the standard can be arranged to produce a diminution of light passing through the plate. At the same time the same departure can be arranged to produce an increase of light due to the first cell. By arranging the photosensitive cells in the bridge circuit in the manner shown, these effects are made additive and the sensibility of the system increased.

The manner of employment of the invention will vary considerably, but in using the invention to check uniformity with a standard product in the case of articles made by repetition processes, it may be convenient to arrange that the articles, or samples of the articles, are brought automatically in turn into the position of the object 1 with suitable locating devices to ensure accurate positioning of the articles, with means operating to indicate the light passing plates 4 and/or 8 when the articles are accurately positioned. The apparatus may then be fully automatic and the amplifier-detector 13 may control an alarm or other device.

In order to keep the photoelectric device in balance a shutter, optical or electrical, which renders the device inoperative during the time the object is moved into position is mechanically connected to the device. The shutter may be an ordinary optical shutter as used in photographic devices or an electrical shutter i. e. a switch which removes the voltage from the photoelectric cell during the time the object is moved into or out of the focus position.

The photographic screens may be on a film running in synchronism with the production.

What I claim is:

1. An apparatus for the detection of variations in the appearance of an object, comprising means for supporting a negative image of said object, means for projecting an optical image upon said image, photo-sensitive means responsive to the light passing through said negative image, further means for supporting a positive image of said object, means for projecting an optical image of said object upon the positive image, photo-sensitive means responsive to the light passing through said positive image, and means responsive to the output from both said photo-sensitive devices.

2. An apparatus according to claim 1, wherein said photo-sensitive devices are connected in the adjacent arms of a bridge circuit.

3. A method of detecting alterations in the appearance of an object which comprises preparing a negative image and a positive image of said object, projecting an optical image of the object upon each of said images, and utilizing the relative intensity of the light passing through said negative and positive images to operate an indicating means.

TOR STULAND.

REFERENCES CITED

The following references are of record in the file of this patent:

UNITED STATES PATENTS

| Number | Name | Date |
| --- | --- | --- |
| 1,838,389 | Goldberg | Dec. 29, 1931 |
| 1,915,993 | Handel | June 27, 1933 |
| 2,026,329 | Tauschek | Dec. 31, 1935 |
| 2,211,320 | Efron | Aug. 13, 1940 |
| 2,380,567 | Yawitz et al. | July 31, 1945 |